United States Patent
Hammerschmidt et al.

(10) Patent No.: US 10,884,118 B2
(45) Date of Patent: Jan. 5, 2021

(54) RADAR SYSTEMS FOR VEHICLES AND METHODS FOR OPERATING RADAR SYSTEMS OF VEHICLES

(71) Applicant: Infineon Technologies AG, Neubiberg (DE)

(72) Inventors: Dirk Hammerschmidt, Finkerstein (AT); Herbert Jaeger, Linz (AT); Rudolf Lachner, Ingolstadt (DE)

(73) Assignee: Infineon Technologies AG, Neubiberg (DE)

( * ) Notice: Subject to any disclaimer, the term of this patent is extended or adjusted under 35 U.S.C. 154(b) by 385 days.

(21) Appl. No.: 15/848,943

(22) Filed: Dec. 20, 2017

(65) Prior Publication Data

US 2018/0210079 A1 Jul. 26, 2018

(30) Foreign Application Priority Data

Dec. 21, 2016 (DE) .......................... 10 2016 125 190

(51) Int. Cl.
*G01S 13/931* (2020.01)
*G01S 7/35* (2006.01)
*G01S 13/48* (2006.01)
*G01S 7/03* (2006.01)
*G01S 13/02* (2006.01)
*H01Q 1/32* (2006.01)

(52) U.S. Cl.
CPC .............. *G01S 13/931* (2013.01); *G01S 7/03* (2013.01); *G01S 7/35* (2013.01); *G01S 13/48* (2013.01); *H01Q 1/3233* (2013.01); *G01S 2013/0254* (2013.01); *G01S 2013/93275* (2020.01)

(58) Field of Classification Search
CPC . G01S 13/931; G01S 7/03; G01S 7/35; G01S 13/48; G01S 2013/93275; G01S 2013/0254; H01Q 1/3233
USPC ........................................................ 342/129
See application file for complete search history.

(56) References Cited

U.S. PATENT DOCUMENTS 5,481,268 A * 1/1996 Higgins .................. G01S 7/032
342/111
5,600,327 A * 2/1997 Shingyoji ............... G01S 7/032
342/175

(Continued)

FOREIGN PATENT DOCUMENTS

DE 69516749 T2 11/2000
DE 69731030 T2 6/2005

OTHER PUBLICATIONS

German Patent Office, Office Action issued for DE 102016125190.9, 10 pgs., dated Nov. 3, 2017.

*Primary Examiner* — Timothy A Brainard
*Assistant Examiner* — Nuzhat Pervin
(74) *Attorney, Agent, or Firm* — Schiff Hardin LLP

(57) ABSTRACT

A radar system for a vehicle includes an antenna element installable at an outer shell of the vehicle, a dielectric waveguide, and a radar circuit configured to communicate with the antenna element via the dielectric waveguide. A vehicle includes a plurality of radar radio heads arranged at an outer shell of the vehicle, a plurality of waveguides, and a radar circuit configured to generate a common local oscillator signal and simultaneously provide respective radio frequency signal derived from the common local oscillator signal to the plurality of radar radio heads via the plurality of waveguides.

22 Claims, 4 Drawing Sheets

(56) References Cited

U.S. PATENT DOCUMENTS

| | | | | |
|---|---|---|---|---|
| 5,640,700 | A * | 6/1997 | Shingyoji | G01S 7/032 333/250 |
| 5,717,399 | A * | 2/1998 | Urabe | H01Q 1/3233 342/70 |
| 6,335,705 | B1 * | 1/2002 | Grace | G01S 7/4017 342/174 |
| 6,414,631 | B1 * | 7/2002 | Fujimoto | G01S 7/03 342/379 |
| 10,033,082 | B1 * | 7/2018 | Izadian | H01Q 21/062 |
| 10,396,468 | B2 * | 8/2019 | Driscoll | H01Q 21/0012 |
| 2002/0097180 | A1 * | 7/2002 | Geisheimer | G01S 13/56 342/127 |
| 2005/0273218 | A1 * | 12/2005 | Breed | B60R 21/20 701/2 |
| 2005/0285776 | A1 * | 12/2005 | Miosga | H01Q 19/062 342/70 |
| 2008/0129408 | A1 * | 6/2008 | Nagaishi | H01P 5/107 333/33 |
| 2010/0188281 | A1 * | 7/2010 | Hayata | H01P 1/2007 342/118 |
| 2012/0119969 | A1 * | 5/2012 | MacDonald | H05K 1/0236 343/841 |
| 2013/0018575 | A1 * | 1/2013 | Birken | G01S 13/885 701/409 |
| 2013/0342412 | A1 * | 12/2013 | Jackson | H01Q 13/02 343/781 R |
| 2014/0240187 | A1 * | 8/2014 | Herbsommer | H01Q 13/00 343/785 |
| 2014/0287701 | A1 * | 9/2014 | Herbsommer | H01Q 1/50 455/90.2 |
| 2015/0203081 | A1 * | 7/2015 | Paulson | B60T 8/58 701/70 |
| 2015/0295297 | A1 * | 10/2015 | Cook | H01P 11/001 333/239 |
| 2015/0295554 | A1 * | 10/2015 | Heikkinen | H03D 7/1466 327/355 |
| 2016/0204496 | A1 * | 7/2016 | Hobden | H01P 5/19 342/200 |
| 2016/0218406 | A1 * | 7/2016 | Sanford | H01Q 19/134 |
| 2016/0240907 | A1 * | 8/2016 | Haroun | H01P 3/16 |
| 2017/0044726 | A1 * | 2/2017 | Buschmann | E01C 19/48 |
| 2017/0077580 | A1 * | 3/2017 | Kawaguchi | H01P 5/028 |
| 2017/0160069 | A1 * | 6/2017 | Folgero | G01N 27/06 |
| 2017/0346169 | A1 * | 11/2017 | Wang | G01S 13/4463 |
| 2018/0011180 | A1 * | 1/2018 | Warnick | G01S 13/06 |
| 2018/0267140 | A1 * | 9/2018 | Corcos | G01S 13/282 |
| 2018/0371729 | A1 * | 12/2018 | Sugino | G01S 13/34 |

* cited by examiner

RADAR SYSTEMS FOR VEHICLES AND METHODS FOR OPERATING RADAR SYSTEMS OF VEHICLES

FIELD

Examples relate to radar systems for vehicles, vehicles equipped with radar systems, and methods for operating radar systems of vehicles.

BACKGROUND

Over the past years significant advances have been made in the area of driver assistance systems for vehicles, for example, for cars. These systems are being developed for providing higher safety, more driving comfort, and with the prospect of creating autonomously driving vehicles. Driver assistance systems rely on inputs from multiple data sources. A primary one of these are radar systems that enable the vehicle to observe and to see its environment and measure speed and distances of targets. Radar systems are superior in various aspects to other imaging systems, for example, they may operate at bright daylight, at darkness, in multiple weather situations such as fog, rain, wind, or snow, and may provide high resolution imaging when being operated in the millimeter wave range. Of interest are often the required operation conditions for the achievement of good radar measurements are at least partly complementary to the ones of optical systems. Such high frequencies usually require sophisticated and expensive electronics and cabling that can process frequencies far above 20 GHz. Hence, there is a desire to reduce costs of such radar systems for vehicles while aiming for improved performance parameters, such as accuracy, resolution, reliability, or sensitivity of the radar system.

At least to some extent, such a demand can be satisfied by the subject matter of the present disclosure.

SUMMARY

According to a first aspect of the present disclosure, it is provided a radar system for a vehicle. The radar system comprises an antenna element installable at an outer shell of the vehicle, a dielectric waveguide, and a radar circuit configured to communicate with the antenna element via the dielectric waveguide.

According to a second aspect of the present disclosure, it is provided a vehicle comprising a plurality of radar radio heads arranged at an outer shell of the vehicle, a plurality of waveguides, and a radar circuit configured to generate a common local oscillator signal and to simultaneously provide respective radio frequency signals derived from the common local oscillator signal to the plurality of radar radio heads via the plurality of waveguides.

According to a third aspect of the present disclosure, it is provided a method for operating a radar system of a vehicle, the method comprising generating a common local oscillator signal with a radar circuit of the vehicle, deriving a phase coherent first and second radio frequency signal from the common local oscillator signal, providing simultaneously the first radio frequency signal to a first antenna element of the vehicle via a first dielectric waveguide and the second radio frequency signal to a second antenna element of the vehicle via a second dielectric waveguide.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
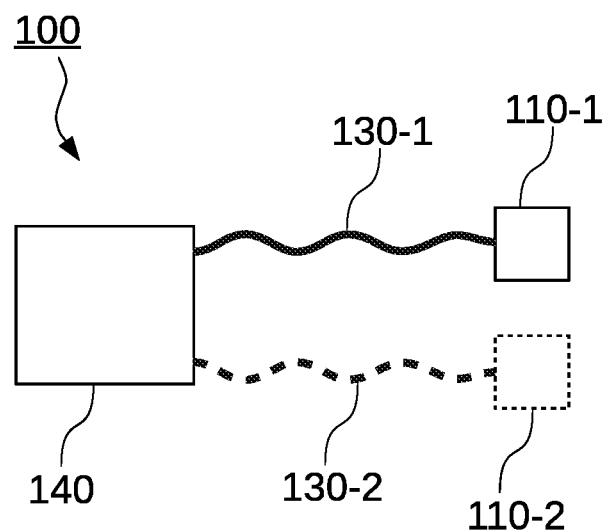
FIG. 1 shows a block diagram of a radar system for a vehicle.

FIG. 1 shows a block diagram of a radar system 100 for a vehicle. The radar system 100 comprises at least one antenna element 110-1 (e.g., a first antenna element) installable at an outer shell of the vehicle. Furthermore, the radar system 100 comprises at least one dielectric waveguide 130-1 (e.g., a first dielectric waveguide). Furthermore, the radar system 100 comprises a radar unit 140 configured to communicate with the antenna element 110-1 via the dielectric waveguide 130-1.

A radar system with a radar unit, which can communicate with at least one antenna element via a dielectric waveguide, can provide flexibility and adaptability to various applications and customer requirements. For example, the number of antenna elements connectable via dielectric waveguides to the radar unit can be flexible. For example, in luxury vehicles and/or in vehicles needing a high precision of their radar system, multiple (e.g., more than one, more than three, more than five, or more than ten) antenna elements can be connected via respective dielectric waveguides to the radar unit. Vehicles, whose manufacturing costs pose more stringent requirements, may be equipped with less antenna elements, for example, just one or two antenna elements. However, in general, the radar unit communicating with one or more antenna elements can avoid providing a dedicated, independent radar transceiver at each antenna element. This can reduce costs of the radar system. Furthermore, employing a dielectric waveguide (or dielectric waveguides) for the communication between the radar unit and the antenna element(s) can further reduce costs and can also protect the radar system against electrostatic discharge (ESD).

The radar unit 140 and at least one antenna element (e.g., the first antenna element 110-1) can be configured for commonly emitting a synthesized radar signal towards a target and/or for simultaneously receiving respective portions of a reflection of a radar signal from the target. In this way, a spatial resolution (e.g., an angular resolution and/or a range resolution) of the radar system 100 can be enhanced.

For example, the radar unit 140 can also be installable at the outer shell of the vehicle and can comprise at least one transmit antenna and at least one receive antenna (or at least one combined transceive antenna). The transmit antenna and the receive antenna (or the transceive antenna) of the radar unit can, for instance, be microstrip antennas such as patch antennas, dipole antennas, monopole antennas, slot antennas, and/or frame antennas in microstrip technology. The first antenna element 110-1 can also comprise a transmit antenna and a receive antenna (or a combined transceive antenna). The antennas (or the antenna) of the first antenna element 110-1 can, for example, be horn antennas (or a horn antenna) coupled to the first dielectric waveguide that can connect the first antenna element 110-1 with the radar unit 140. The radar unit 140 and the first antenna element 110-1 can both emit respective radar signals, which can be phase coherent and can form a synthesized radar signal. The radar unit (and/or the first antenna element 110-1) can be configured to adjust a phase shift between the respective radar signals, so that the direction of propagation of the synthesized radar signal can be controlled. The radar signal emitted by the first antenna element 110-1 (or an RF signal corresponding to the radar signal) can, for example, be provided by the radar unit 140 via the first dielectric waveguide 110-1.

Additionally or alternatively, the radar unit 140 and at least one antenna element (e.g., the first antenna element 110-1) can be configured for simultaneously receiving respective portions of a reflection of a radar signal from the target. The reflected radar signal can be the synthesized radar signal commonly emitted by the radar unit 140 and the first antenna element 110-1, or can be a radar signal that has been emitted solely by the radar unit 140 or solely by the first antenna element 110-1 (or solely by another optional antenna element of the radar system 100). Simultaneously receiving respective portions of a reflection of a radar signal at the radar unit 140 and at the first antenna element 110-1 can allow determining a direction from the radar system 100 to the target, for instance, by triangulation and/or by direction of arrival estimation based algorithms, such as MUSIC (Multiple Signal Classification) and/or ESPRIT (Estimation of Signal Parameter via Rotational Invariance Technique). For example, the radar unit 140 can be configured to determine the direction towards the target.

Furthermore, upon reception of the respective portions of the reflected radar signal, the radar unit 140 and the first antenna element 110-1 (and optionally additional antenna elements of the radar system 100) may mix the respective portions of the reflected radar signal to an intermediate frequency or to baseband using a common local oscillator signal. This common local oscillator signal can, for example, be generated by the radar unit 140 and be provided via the first dielectric waveguide 130-1 to the first antenna element 110-1 (and optionally via additional dielectric waveguides to additional antenna elements). The radar unit may correlate the respective frequency converted portions of the reflected radar signal and thus reduce phase noise and/or amplitude noise contributed by the common local oscillator signal. This can enhance the sensitivity and/or reduce the noise figure of the radar system 100.

The radar system 100 can further comprise a second antenna element 110-2. The second antenna element 110-2 can be installable at the outer shell of the vehicle. Moreover, the radar system 100 can comprise a second dielectric waveguide 130-2. The radar unit 140 can be configured to simultaneously communicate with the first antenna element 110-1 via the first dielectric waveguide 130-1 and with the second antenna element 110-2 via the second dielectric waveguide 130-2.

By providing a radar system with a radar unit, which can simultaneously communicate with a plurality of antenna elements via a plurality of dielectric waveguides, a spatial resolution (e.g., an angular resolution and/or a range resolution) of the radar system can be enhanced. For detection and/or tracking of targets, the radar unit can simultaneously provide signals to the antenna elements and/or simultaneously receive signals from the antenna elements via the dielectric waveguides. In this way, signals used for detection and/or tracking of targets at the antenna elements can be correlated which can be used for reducing noise (e.g., phase noise and/or amplitude noise) in the radar system. The radar unit can further perform signal processing of signals provided by the different antenna elements and hence combine target related information delivered by the antenna elements for more accurate and more reliable detection and/or tracking of targets (e.g., by triangulation between the 2 or more antenna elements). For example, each of the antenna elements can be installed at a different position at an outer shell (e.g., a body shell, a bumper, a windscreen, a rear window, an exterior mirror, a trunk, etc.) of a vehicle. In this way, triangulation with improved accuracy can be achieved, for example.

Communication of the radar unit 140 with the first and/or the second antenna element 110-1, 110-2 via the first and/or the second dielectric waveguide 130-1, 130-2, respectively, can comprise providing signals from the radar unit 140 to the first and/or the second antenna element 110-1, 110-2, and/or can comprise providing signals from the first and/or the second antenna element 110-1, 110-2 to the radar unit 140. In other words, the transmission of signals between the radar unit 140 and the first and/or the second antenna element 110-1, 110-2 via the first and the second dielectric waveguide 130-1, 130-2, respectively (and/or with optional additional antenna elements via additional respective dielectric waveguides), can be unidirectional (from the radar unit to the antenna element(s) or vice versa) or can be bidirectional.

The radar unit 140 can be configured to generate phase coherently a first and a second radio frequency signal (RF signal). Additionally, the radar unit 140 can be configured to provide the first RF signal to the first antenna element 110-1 via the first dielectric waveguide 130-1, and to provide the second RF signal to the second antenna element 110-2 via the second dielectric waveguide 130-2. By providing phase coherent RF signals to the first and the second antenna element 110-1, 110-2 phase noise and/or the noise figure of the radar system 100 can be reduced. This can in turn enhance the sensitivity of the radar system 100.

For example, the first antenna element 110-1 can be configured to emit a radar signal corresponding to the first RF signal. The radar signal emitted by the first antenna element 110-1 can be the first RF signal or can be generated from the first RF signal.

To this end, the radar unit 140 can be configured to generate a common local oscillator signal and to derive the first and the second RF signal from the common local oscillator signal. The first and the second RF signal can be the common local oscillator signal or can be a harmonic of the local oscillator signal. At the first antenna element 110-1, the first RF signal corresponding to the common local oscillator signal (or to harmonic thereof) can be used to up-convert a baseband signal provided, for example, by the first antenna element and thus to generate the emitted radar signal. Alternatively, the first RF signal corresponding to the common local oscillator signal (or to harmonic thereof) can itself be emitted by the first antenna element 110-1.

Additionally, the second antenna element 110-2 can be configured to simultaneously (e.g., simultaneously to the emission of the radar signal by the first antenna element 110-1) emit a second radar signal corresponding to the second RF signal. In this way, a direction of emission of a synthesized radar signal constituted (at least) by the first and the second radar signal can be controlled. As for the first RF signal, the second RF signal can correspond to the common local oscillator signal (or to harmonic thereof) and can be used to up-convert a (second) baseband signal provided, for example, by the second antenna element 110-2 and thus to generate the second radar signal. Alternatively, the second RF signal corresponding to the common local oscillator signal (or to harmonic thereof) can itself be emitted by the second antenna element 110-2.

An antenna element (e.g., the first and/or the second antenna element 110-1, 110-2) can be configured to transform a transmission line bound electromagnetic wave to a free space electromagnetic wave. For example, for emission of the first radar signal from the first antenna element 110-1 and/or for the emission of the second radar signal from the second antenna element 110-2, the first and/or the second antenna element 110-1, 110-2 can each comprise an antenna, for example, a respective patch antenna, microstrip antenna and/or horn antenna coupled to the end of the first and/or the second dielectric waveguide 130-1, 130-2.

In some embodiments, at least one antenna element can be implemented as an open end of a dielectric waveguide. For example, the first antenna element 110-1 can be implemented as an open end of the first dielectric waveguide 130-1. The first RF signal can then be emitted as the first radar signal from the open end of the first dielectric waveguide 130-1. Additionally or alternatively, the second antenna element 110-2 can be implemented as an open end of the second dielectric waveguide 130-2. The second RF signal can then be emitted as the second radar signal from the open end of the second dielectric waveguide 130-2. Implementing at least one antenna element as an open end of a dielectric waveguide can avoid providing additional antennas, which can safe production costs and/or ease space requirements when installing the radar system 100 in a vehicle.

Additionally, a characteristic impedance of the first and/or the second dielectric waveguide 130-1, 130-2 can be larger than 150 Ohm (or larger than 200 Ohm, or larger than 300 Ohm) and/or can be smaller than 500 Ohm (or smaller than 450 Ohm, or smaller than 400 Ohm). This can provide an improved matching of the characteristic impedance of the first and/or the second dielectric waveguide 130-1, 130-2 to the impedance of free space, when the first and/or the second antenna element 110-1, 110-2 are implemented as an open end of the first and/or the second dielectric waveguide 130-1, 130-2, respectively.

The first antenna element 110-1 can be configured to amplify the first RF signal, and the second antenna element 110-2 can be configured to amplify the second RF signal. To this end, the first antenna element 110-1 can comprise a first RF amplifier and the second antenna element 110-2 can comprise a second RF amplifier. In this way, the insertion loss of the first and the second dielectric waveguide 130-1, 130-2 can be recovered at the first and the second antenna element 110-1, 110-2, respectively. Furthermore, amplifying the first and the second RF signal can provide sufficient transmit power to first and the second radar signal, respectively, and/or can make the first and/or the second RF signal useable for driving a respective mixer at the first and/or the second antenna element 110-1, 110-2.

The first antenna element 110-1 can be configured to modulate the first RF signal, and/or the second antenna element 110-2 can be configured to modulate the second RF signal. For example, the first antenna element 110-1 can comprise a first mixer to modulate the first RF signal with a first baseband signal provided by the first antenna element 110-1. In this way, the first antenna element 110-1 can be configured to modulate the amplitude, the frequency, and/or the phase of the first RF signal and thus to transform the first RF signal into a first radar signal emitted by the first antenna element 110-1.

Similarly, the second antenna element 110-2 can comprise a second mixer to modulate the second RF signal with a second baseband signal provided by the second antenna element 110-2. In this way, the second antenna element 110-2 can be configured to modulate the amplitude, the frequency, and/or the phase of the second RF signal and thus to transform the second RF signal into a second radar signal emitted by the second antenna element 110-2.

By modulating the amplitude of the first and/or the second RF signal, the radar system 100 can be operated according to the principles of a pulse radar that emits short and powerful pulses and in the silent period receives reflections corresponding to the emitted pulses. By modulating the frequency of the first and/or the second RF signal, the radar system 100 can be operated according to the principles of a frequency modulated continuous wave (FMCW) radar. For example, this can allow determining the position and the (radial) speed of a target detected by the radar system 100.

Alternatively (or additionally) to modulating the first and the second RF signal at the first and/or the second antenna element 110-1, 110-2, respectively, the radar unit 140 can be configured to modulate the first and the second radio frequency signal. This can reduce hardware effort at the first and/or the second antenna element 110-1, 110-2, and hence reduce costs. For example, the radar unit 140 can comprise a voltage controlled oscillator (VCO) to modulate the frequency of the common local oscillator signal. To derive the first and the second RF signal from the common local oscillator signal, the radar unit 140 can comprise a power splitter (e.g., a Wilkinson divider, a directional coupler and/or a resistive power splitter). The radar unit 140 can then derive first and the second RF signal by splitting the power of the common local oscillator signal to dedicated signals paths of the first and the second RF signal.

For example, in order to control a direction of emission of a synthesized radar signal (that is constituted by the first and the second radar signal), the radar unit 140 can be configured to adjust a phase shift between the first and the second radio frequency signal. To this end, the radar unit 140 can comprise respective phase shifter circuits in the signal paths of the first and the second RF signal (or at least one phase shifter circuit in one of the signals paths). Alternatively, or additionally, the first antenna element 110-1 can be configured to adjust a phase of the first RF signal, and/or the second antenna element 110-2 can be configured to adjust a phase of the second radio frequency signal. To this end, the first antenna element 110-1 can comprise a (first) phase shifter circuit and/or the second antenna element 110-2 can comprise a (second) phase shifter circuit. In other words, by adjusting a phase shift between the first and the second RF signal at the radar unit 140 and/or at the first and/or the second antenna element 110-1, 110-2, the radar system 100 can be configured for digital beamforming. For this purpose, the first and the second antenna element may be arranged adjacent to each other and face substantially the same direction.

Furthermore, the radar unit 140 can be configured to multiply the common local oscillator signal and to derive the first and the second RF signal from the multiplied common local oscillator signal. In other words, the first and the second radio frequency signal may be a harmonic of the common local oscillator signal (e.g., the second harmonic, the third harmonic, the fourth harmonic, or a higher harmonic). Herein, the second harmonic refers to twice the fundamental frequency of the common local oscillator signal, the third harmonic to three times the fundamental frequency, and so on. To this end, the radar unit can comprise a frequency multiplier and may additionally comprise a push-push oscillator that can already provide the second harmonic of the common local oscillator signal. For deriving the first and the second RF signal from the multiplied common local oscillator signal, the radar unit can comprise corresponding filter circuitry (e.g., low pass, high pass, and/or band pass filters) with pass bands in the frequency range of the wanted harmonic of the common local oscillator signal. Deriving the first and the second RF signal from the multiplied common local oscillator signal can provide a higher frequency of the first and the second RF signal. A higher frequency of the first and the second RF signal can reduce bending losses occurring within the first and the second dielectric waveguide 110-1, 110-2. Moreover, a higher frequency of the first and the second RF signal can allow reducing the diameter of the first and the second dielectric waveguide 110-1, 110-2, which can facilitate installing the radar system 100 in vehicles, where installation space may be limited.

If a lower frequency of the first and the second radar signal than that of the first and the second RF signal is required, respective frequency dividers may be employed at the first and the second antenna element 110-1, 110-2 to reduce the frequency of the first and the second RF signal. According to an embodiment, the frequency of the first and the second radar signal is in the frequency range between 76 GHz and 81 GHz and the frequency of the first and the second radar signal is between 152 GHz and 162 GHz.

The first radar signal emitted by the first antenna element 110-1, the second radar signal emitted by the second antenna element 110-2, and/or a synthesized radar signal constituted (at least) by the first and the second radar signal emitted simultaneously by the first and the second antenna element 110-1, 110-2, can be reflected at a target (e.g., a target outside the vehicle the radar system 100 is installed in). At the target, portions of the incident radar signal can be reflected into different directions, for example, back to the first and/or the second antenna element 110-1, 110-2. The first antenna element 110-1 can be configured to provide a first receive signal to the radar unit 140. The first receive signal can correspond to a first portion of the radar signal reflected from the target and incident at the first antenna element. Additionally, the second antenna element 110-2 can be configured to simultaneously provide a second receive signal to the radar unit 140. The second receive signal can correspond to a second portion of the reflected radar signal incident at the second antenna element.

Additionally, the radar unit 140 can be configured to derive a position and/or speed of the target based on at least the first and/or the second receive signal.

By providing a first receive signal from the first antenna element 110-1 and a second receive signal from the second antenna element 110-2 to the radar unit 140, the radar unit 140 can receive more versatile information about the target. For example, the radar unit 140 can use the first and the second receive signal for spatial filtering and hence for the suppression of unwanted signals in the received signals. By receiving the first and the second receive signal, the radar unit may also determine a direction to the target by triangulation and/or by direction of arrival estimation based algorithms, such as MUSIC (Multiple Signal Classification) and/or ESPRIT (Estimation of Signal Parameter via Rotational Invariance Technique).

Moreover, the radar system 100 can further comprise at least one radar lens configured to focus the first portion of the reflected radar signal towards the first antenna element 110-1 and to focus the second portion of the reflected radar signal towards the second antenna element 110-2. According to an example, the radar system 100 comprises a first and a second radar lens. The first radar lens is configured to focus the first portion of the reflected radar signal towards the first antenna element 110-1. The second radar lens is configured to focus the second portion of the reflected radar signal towards the second antenna element 110-2. Providing radar lenses can increase the receive power at the first and the second antenna element 110-1, 110-2.

According to an embodiment, firstly, the first antenna element 110-1 emits the first radar signal, while the second antenna element does not emit. The first radar signal can be reflected at a target. A first portion of the reflected first radar signal can be received, converted into a first receive signal, and provided to the radar unit 140 by the first antenna element 110-1. Additionally, the second antenna element 110-2 can receive a second portion of the reflected first radar signal, convert it into a second receive signal, and provide the second receive signal to the radar unit 140. The radar unit 140 can then derive a position and/or speed of the target based on (at least) the first and/or the second receive signal.

Next, the second antenna element 110-2 can emit the second radar signal, while the first antenna element does not emit. The second radar signal can also be reflected at the target. A first portion of the reflected second radar signal can be received, converted into a third receive signal, and provided to the radar unit 140 by the first antenna element 110-1. The second antenna element 110-2 can receive a second portion of the reflected second radar signal, convert it into a fourth receive signal, and provide the fourth receive signal to the radar unit 140. The radar unit 140 can then derive again the position and/or speed of the target based on the third and the fourth receive signal or based on the first, second, third, and fourth receive signal (or any combination thereof). This can enhance the accuracy of the derived position and/or speed of the target. Moreover, the reliability of target detection and/or tracking can be enhanced. For example, the target may provide different radar cross sections to the first and the second antenna element 110-1, 110-2 because the first and the second antenna element 110-1, 110-2 can illuminate the target with radar signals from different positions and hence from different angles if the first and the second antenna element 110-1, 110-2 are arranged at different positions (e.g., spaced at least 10 cm, or at least 50 cm, or at least 1 m, or at least 2 m apart from each other). Illuminating the target with radar signals from different angles, can provide in one case or the other higher receive power at the first and/or the second antenna element 110-1, 110-2. Furthermore, different velocity components of the target (e.g., one velocity component towards the first antenna element 110-1 and one towards the second antenna element 110-2) can be obtained by illuminating the target first by the first antenna element 110-1 and next by the second antenna element 110-2. In this way, not only a radial speed of the target, but also the total speed of the target (and/or the direction of target movement) can be determined by the radar unit 140.

In order to provide the first and the second receive signal to radar unit 140, various options exist. For example, the radar system 100 can comprise a third dielectric waveguide. The first antenna element 110-1 can be configured to provide the first receive signal to the radar unit 140 via the third dielectric waveguide. The third dielectric waveguide can thus be coupled between the radar unit 140 and the first antenna element. When the first antenna element 110-1 comprises a transceive antenna (e.g., a horn antenna, a rod antenna, or a microstrip antenna) for emitting the first radar signal and for receiving reflections (or portions of reflections) of radar signals, the first antenna element 110-1 can comprise a signal splitter configured to provide the first radar signal from the first dielectric waveguide 130-1 to the transceive antenna and to provide the received portion of a reflected radar signal from the transceive antenna to the third dielectric waveguide. The signal splitter of the first antenna element can, for example, comprise a directional coupler and/or a power splitter to couple the transceiver antenna to the first and the third dielectric waveguide. At the radar unit 140, the third dielectric waveguide can be coupled to a receiver input port of the radar unit 140, whereas the first dielectric waveguide can be coupled to a transmitter output port or a local oscillator output port of the radar unit 140.

Additionally and optionally, the radar system 100 can comprise a fourth dielectric waveguide. The second antenna element 110-2 can be configured to provide the second receive signal to the radar unit 140 via the fourth dielectric waveguide. Similarly as explained above for the first antenna element 110-1, the second antenna element 110-2 can comprise a transceive antenna and a signal splitter to separate the second radar signal and a received portion of a reflected radar signal. The fourth dielectric waveguide can be coupled to another receiver input port of the radar unit 140. The second dielectric waveguide 130-2 can be coupled to another transmitter output port or to another local oscillator output port of the radar unit 140, for example. As an alternative for two different transmitter or local oscillator output ports of the radar unit 140, the radar system can comprise a waveguide power splitter or directional coupler (e.g., a magic tee) coupled to a transmitter and/or local oscillator output port of the radar unit 140 and configured to provide the first RF signal to the first dielectric waveguide 130-1 and the second RF signal to the second dielectric waveguide 130-2.

As an alternative for the use of a signal splitter together with a transceive antenna, the first and/or the second antenna element 110-1, 110-2, can comprise a respective transmit antenna configured to emit the respective radar signal and coupled to the first and/or the second dielectric waveguide, respectively, and a respective receive antenna configured to receive a portion of a reflected radar signal and coupled to the third and/or the fourth dielectric waveguide, respectively.

Furthermore, it is also possible to use a dielectric waveguide for bidirectional communication between the radar unit 140 and at least one of the first and the second antenna element 110-1, 110-2. For example, the radar system 100 can further comprise a signal splitter connected between the second dielectric waveguide 130-2 and the radar unit 140. The second antenna element 110-2 can be configured to provide the second receive signal to the radar unit 140 via the second dielectric waveguide 130-2. The signal splitter can be configured to couple the second receive signal to the radar unit 140 and can be configured to couple the second radio frequency signal to the second dielectric waveguide.

For example, the signal splitter can be a (dielectric) waveguide splitter, e.g., a magic tee divider or a directional coupler in waveguide technology. A common port of the signal splitter may then be coupled to the second dielectric waveguide 130-2. A first thru port of the signal splitter can be coupled to a transmitter and/or local oscillator output port of the radar unit 140, while a second thru port of the signal splitter can be coupled to a receiver input port of the radar unit 140. Alternatively, the signal splitter can be integrated into the radar unit 140. To this end, the second dielectric waveguide 130-2 can be coupled to a (bidirectional) transceiver port of the radar unit 140. The common port of the signal splitter may then be coupled to the transceiver port. The first thru port of the signal splitter can be coupled to a transmitter and/or local oscillator signal path of the radar unit 140, while the second thru port of the signal splitter can be coupled to a receiver signal path of the radar unit 140. The signal splitter integrated into the radar unit 140 can be realized in microstrip technology, for example. Of course, the radar system 100 can comprise more than one signal splitter that can be coupled to other dielectric waveguides (e.g., the first dielectric waveguide 130-1), so that also other dielectric waveguides can be used for bidirectional communication between the radar unit 140 and respective antenna elements (e.g., the first antenna element 110-1).

A signal splitter can enable bidirectional communication over a dielectric waveguide. This can reduce the number of dielectric waveguides of the radar system 100 and hence reduce the cabling effort and/or installation effort when installing the radar system 100 in a vehicle.

In some embodiments, the first antenna element 110-1 can be configured to mix the first portion of the reflected radar signal with the first RF signal for providing the first receive signal. Additionally, the second antenna element 110-2 can be configured mix the second portion of the reflected radar signal with the second RF signal for providing the second receive signal. To this end, the first antenna element 110-1 can comprise a first mixer, and the first RF signal can drive this first mixer as a local oscillator. The second antenna element 110-2 can comprise a second mixer, and the second RF signal can drive this second mixer as a local oscillator. Because the first and the second RF signal can be derived from the common local oscillator signal of the radar unit 140 (e.g., be the common local oscillator signal or a harmonic thereof), phase noise (and/or amplitude noise) contributed by the first RF signal to the first receive signal can be correlated to phase noise (and/or amplitude noise) contributed by the second RF signal to the second receive signal. This can enable the radar unit 140 to perform noise cancellation of phase noise (and/or amplitude noise) in the first and second receive signal when evaluating the first and the second receive signal.

According to some examples, the first antenna element 110-1 can be configured to demodulate the first portion of the reflected radar signal for providing the first receive signal. Additionally, the second antenna element 110-2 can be configured to demodulate the second portion of the reflected radar signal for providing the second receive signal.

To demodulate the respective portions of the reflected radar signal, they may be down-converted. For example, the first antenna element 110-1 can be configured to down-convert the first portion of the reflected radar signal using the first RF signal as a local oscillator. Likewise, the second antenna element 110-2 element can be configured down-convert the second portion of the reflected radar signal using the second RF signal as a local oscillator. The down-converted first portion of the reflected radar signal can then correspond to (e.g., be) the first receive signal and the down-converted the second portion of the reflected radar signal can correspond to (e.g., be) the second receive signal. The first and the second receive signal can then be on an intermediate frequency or at baseband. They may then be provided to the radar unit by respective transmission lines such as respective coaxial cables and/or twisted wire pair cables. Down-converting the received first and second portion of the reflected radar signal before providing the corresponding first and second receive signal to the radar unit 140, can reduce the insertion loss to which the first and the second receive signal are subjected when traveling to the radar unit 140. For example, the insertion loss of a coaxial cable and/or a twisted wire pair cable at an intermediate frequency or baseband (e.g., at several kilo-Hertz to several Mega-Hertz or to about a Giga-Hertz) can be lower (e.g., lower by more than 5 dB, or lower by more than 10 dB) than the insertion loss of a dielectric waveguide at millimeter wave frequencies (e.g., frequencies larger than 30 GHz).

The first and/or the second antenna element may be configured to provide the first and/or the second down-converted receive signal, respectively, as analog signals and/or digital signals to the radar unit 140.

For example, the first antenna element 110-1 can be configured to derive first digital data from the demodulated first portion of the reflected radar signal. The second antenna element 110-2 can be configured to derive second digital data from the demodulated second portion of the reflected radar signal. The first and/or the second digital data derived from the respective demodulated portions of the reflected radar signal, can comprise information about the target, for example, a distance from the target to first and/or the second antenna element 110-1, 110-2, respectively, and/or a speed component of the target in direction of the first and/or the second antenna element 110-1, 110-2, respectively. Additionally or alternatively, the first and the second digital data can comprise frequency information of the demodulated first and second portion of the reflected radar signal, respectively. This frequency information can, for example, be indicative for a distance from the target to the first and/or the second antenna element 110-1, 110-2, respectively, and/or for a speed component of the target in direction of the first and/or the second antenna element, respectively. Additionally or alternatively, the digital data can comprise phase information of the demodulated first and second portion of the reflected radar signal. This phase information can, for example, be indicative for a direction from the first and/or the second antenna element 110-1, 110-2 to the target, respectively. The derivation of the first and the second RF signal from the common local oscillator signal of the radar unit 140 may enable the derivation of phase information from the demodulated first and/or second portion of the reflected radar signal. The first and/or the second antenna element 110-1, 110-2 may provide the first and/or the second digital data to the radar unit 140 via respective additional transmission lines (e.g., via respective ribbon cables and/or respective twisted wire pair cables).

Alternatively, according to some examples, the first antenna element 110-1 can be configured to derive the first digital data from the demodulated first portion of the reflected radar signal and to modulate the first receive signal according to the first digital data. Additionally, the second antenna element 110-2 can be configured to derive second digital data from the demodulated second portion of the reflected radar signal and to modulate the second receive signal according to the second digital data.

For example, to modulate the first receive signal, the first antenna element 110-1 can comprise a first up-conversion mixer. This first up-conversion mixer may up-convert a baseband signal corresponding to the first digital data. A local oscillator of the first up-conversion mixer may be provided by the first RF signal. The first receive signal may then have a frequency above the cutoff frequency of the first dielectric waveguide 130-1 (or above that of the third dielectric waveguide), so that the first receive signal can be provided (e.g., communicated) to the radar unit 140 via the first dielectric waveguide (or via the third dielectric waveguide, respectively).

Likewise, to modulate the second receive signal, the second antenna element 110-2 can comprise a second up-conversion mixer. This second up-conversion mixer may up-convert a baseband signal corresponding to the second digital data. A local oscillator of the second up-conversion mixer may be provided by the second RF signal. The second receive signal may then have a frequency above the cutoff frequency of the second dielectric waveguide 130-2 (or above that of the fourth dielectric waveguide), so that the second receive signal can be provided (e.g., communicated) to the radar unit 140 via the second dielectric waveguide 130-2 (or via the fourth dielectric waveguide, respectively).

The communication of the first and/or the second receive signal (containing the first and second digital data, respectively, or being analog signals) via dielectric waveguides to the radar unit 140 can be more robust against interfering signals than a communication at intermediate or baseband frequencies. For example, interfering signals may have frequencies below the cutoff frequency of the dielectric waveguides and may hence be strongly attenuated if they might couple into a dielectric waveguide. Furthermore, communication of the first and/or the second receive signal via dielectric waveguides can reduce the cabling effort and/or the installation effort of the radar system 100 inside a vehicle.

According to some embodiments, the first antenna element 110-1 can be configured to up-convert the first portion of the reflected radar signal. Additionally, the second antenna element 110-2 can be configured up-convert the second portion of the reflected radar signal. For the up-conversion the first and the second antenna elements may employ respective up-conversion mixers driven, for instance, by local oscillator signals derived from the first and the second RF signal, respectively. The first receive signal may then correspond to (e.g., be) the up-converted first portion of the reflected radar signal. The first antenna element 110-1 may then provide the first receive signal via the first dielectric waveguide 130-1 (or via the optional third dielectric waveguide) to the radar unit 140. The second receive signal may correspond to (e.g., be) the up-converted second portion of the reflected radar signal. The second antenna element 110-1 may then provide the second receive signal via the second dielectric waveguide 130-2 (or via the optional fourth dielectric waveguide) to the radar unit 140. Due to the increased frequency of the first and the second receive signal after the upconversion, the first and the second receive signal may be subjected to reduced bending losses of the dielectric waveguides when traveling to the radar unit 140.

According to some examples, the first and the second antenna element 110-1, 110-2 constitute at least a part of an antenna array. This can enable the first and the second antenna element 110-1, 110-2 to synthesize a radar signal and to control a direction of emission of the synthesized radar signal. Additionally, by aid of an antenna array a direction of arrival of a radar signal (e.g., the synthesized radar signal) reflected from a target and hence a direction towards the target can be determined. If the radar system 100 comprises more than two antenna elements, additional antenna elements of the radar system 100 can be integrated into the antenna array. Furthermore, the antenna array may be a linear array or a two dimensional array. The antenna array may be a uniform array (e.g., comprising antennas spaced about half a wavelength of the emitted radar signal apart from each other) or may be a thinned antenna array (e.g., comprising antennas spaced in irregular distances apart from each other).

Each antenna element (e.g., the first and/or the second antenna element 110-1, 110-2) may also in itself comprise an antenna array. The antenna arrays of the antenna elements may be sub arrays of an antenna array formed by the antenna elements of the radar system 100 or may be independent antenna arrays. The latter may enable each antenna element to independently control a direction of emission of a respective radar signal from itself and/or to determine a direction of arrival of a portion of a reflected radar signal incident to itself.

The radar unit 140 can comprise at least one antenna (e.g., a transmit antenna, a receive antenna, and/or a transceive antenna) being an element of the antenna array. By providing transmit, receive, and/or transceive antennas (or pluralities thereof) to the radar unit 140 and including these antennas as elements in the antenna array, the number of antenna elements connected via dielectric waveguides to the radar unit may be reduced. This can decrease the power consumption of the radar system 100.

Alternatively, if the radar system 100 comprises only one antenna element (e.g., the first antenna element 110-1), the radar unit can comprise at least one transmit antenna and at least one receive antenna (or at least one transceive antenna) and form an antenna array together with at least one transmit antenna and at least one receive antenna (or at least one combined transceive antenna) of the first antenna element 110-1.

According to some examples, the radar unit 140 can comprise a first and a second coupling antenna. The first coupling antenna can be coupled to the first dielectric waveguide. The second coupling antenna can be coupled to the second dielectric waveguide. In this way, the first and the second coupling antenna may provide means for connecting the first and the second dielectric waveguide to the radar unit 140, respectively. For example, the first coupling antenna may provide the first RF signal to the first dielectric waveguide and/or may couple the first receive signal from the first dielectric waveguide 130-1 to the radar unit 140. Likewise, the second coupling antenna may provide the second RF signal to the second dielectric waveguide 130-2 and/or may couple the second receive signal from the second dielectric waveguide 130-2 to the radar unit 140. Of course, additional optional dielectric waveguides of the radar system 100 (e.g., the third and/or fourth dielectric waveguide) can be coupled via additional coupling antennas of the radar unit 140 to the radar unit 140. Coupling antennas may reduce the insertion losses to which the first/or and the second RF signal, and/or the first and/or the second receive signal are subjected to when leaving and/or entering the radar unit 140, respectively.

In case the radar system 100 comprises only one antenna element and only one dielectric waveguide, the radar unit 140 may comprise at least one coupling antenna for connecting the dielectric waveguide.

For example, the coupling antennas can be microstrip antennas such as patch antennas, dipole antennas, monopole antennas, slot antennas, and/or frame antennas in microstrip technology. A face side of a respective dielectric waveguide may be attached (e.g., glued or held by a fixture) to a respective coupling antenna. A dielectric layer (e.g., constituted by the glue or by a coating material) may be located between the face side of the respective dielectric waveguide and the respective coupling antenna. This dielectric layer may support transforming an electromagnetic field of the coupling antenna into the field of a propagable mode in the dielectric waveguide (or vice versa).

In some embodiments, the radar unit can comprise an integrated radar circuit. The first and the second coupling antenna (and optional additional coupling antennas) can be integrated in the integrated radar circuit. This can further reduce the insertion losses to which the first/or and the second RF signal, and/or the first and/or the second receive signal are subjected to when leaving and/or entering the radar unit 140, respectively.

The radar unit 140 (e.g., the integrated radar circuit) can comprise analog, mixed signal and/or digital signal processing circuitry. For example, the radar unit 140 can comprise a tunable local oscillator (e.g., a voltage controlled oscillated together with a phase locked loop circuit) for providing the common local oscillator signal and/or may comprise one or more transmit signal paths for phase coherently generating the first and/or the second RF signal. The one or more transmit signal paths can comprise amplification circuitry, mixing, filtering and/or matching circuitry and/or digital-to-analog conversion circuitry, for example. Furthermore, the radar unit 140 can comprise one or more receive signal paths for receiving the first and/or the second receive signal. The one or more receive signal paths can comprise low-noise-amplifier circuitry, mixing, filtering and/or matching circuitry and/or analog-to-digital conversion circuitry. The radar unit 140 may comprise digital circuitry (e.g., integrated into the integrated radar circuit or at least parts of a digital signal processor, a microcontroller, a field-programmable gate array, an application specific integrated circuit, and/or a central processing unit). This digital circuitry can, for example, be employed for deriving a position and/or speed of a target and/or for modulating the common local oscillator signal and/or the first and/or the second RF signal. In other words, the radar unit 140 can be a radar transceiver.

The radar unit 140 may be realized as an integrated circuit mounted on a printed circuit board and/or may be realized by various components mounted on a printed circuit board, for example. Moreover, the radar unit 140 may be shielded by a shielded housing to be protected against interfering signals, electrostatic discharge and/or environmental influences such as low and/or high temperatures and/or moisture. Dielectric waveguides of the radar system may be fed through a compartment wall (or compartment walls) of the shielded housing.

Dielectric waveguides (e.g., the first and/or the second dielectric waveguide 110-1, 110-2) of the radar system may be solid and/or hollow waveguides. Solid dielectric waveguides may comprise a core (and additionally a coat around the core) out of a polymeric material. The core and the optional coat may have different dielectric constants. Hollow dielectric waveguides may comprise an air core that is surrounded by a polymeric coat. Furthermore, according to some examples, dielectric waveguides may be additionally coated by conductive materials (such as copper, aluminum, iron, silver, gold, and/or alloys thereof).

Antenna elements (e.g., the first and/or the second antenna element 110-1, 110-2) of the radar system 100 can be active or passive devices. Circuitry of the antenna elements described within the scope of this disclosure may be integrated into respective integrated circuits of the antenna elements and/or may be realized on printed circuit board level. For example, each antenna element may comprise a respective circuit board with signal processing circuitry for transmitting radar signals and/or receiving reflections of radar signals.

The outer shell of the vehicle can comprise a body shell, a bumper, a windscreen, a rear window, an exterior mirror, a trunk, etc. of the vehicle. For installation of the antenna element(s) (and optionally the radar unit 140) at the outer shell, the radar system 100 may comprise means for mounting (e.g., fixtures, muffles, screws, flanges, etc.). Herein, the formulation "installable at the outer shell of the vehicle" refers to the antenna elements (e.g., the first and/or the second antenna element 110-1, 110-2 and optionally additionally the radar unit 140) being installable in a proximity of the outer shell (e.g., a maximum distance from any of the antenna elements and optionally the radar unit 140 to the outer shell may be shorter than 30 cm, or shorter than 15 cm, or shorter than 5 cm, or shorter than 1 cm) and/or being installable on the inside and/or on the outside of the outer shell. For example, the antenna elements can be installable inside the outer shell at some distance from the outer shell. The outer shell may additionally comprise one or more openings, one or more radar transparent windows and/or one or more lenses (e.g., radar lenses) for allowing an emission of radar signals from the antenna elements and optionally the radar unit 140 through the outer shell. According to an embodiment, the antenna elements are implemented as open ends of their respective dielectric waveguides and are installable inside a bumper of the vehicle. In particular, the open ends of the dielectric waveguides can be installable in respective openings inside the bumper and/or can be installable behind respective radar transparent windows and/or respective radar lenses. The radar transparent windows and/or radar lenses can be arranged in the bumper.

Figure 2:
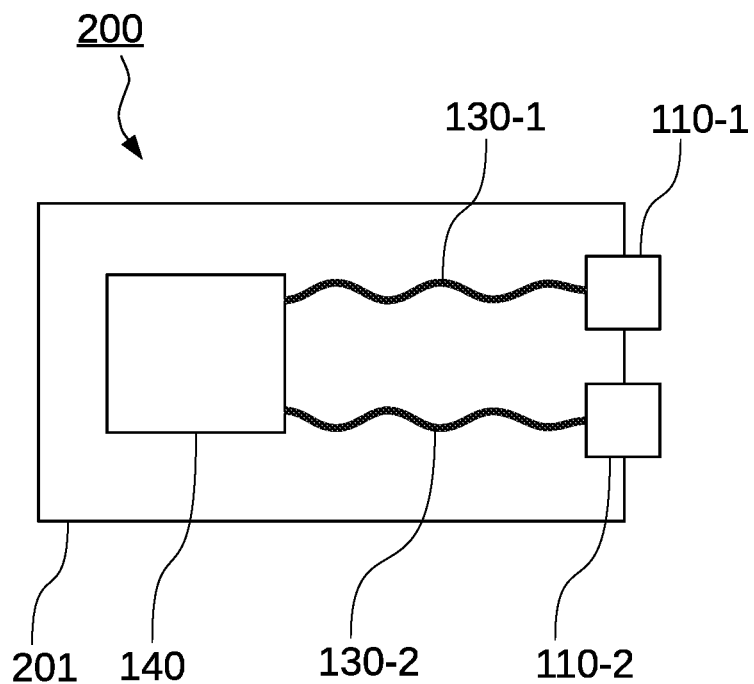
FIG. 2 shows a block diagram of a vehicle.

FIG. 2 shows a block diagram of a vehicle 200. The vehicle 200 comprises a plurality of radar radio heads 110-1, 110-2 arranged at an outer shell 201 of the vehicle 200. Furthermore, the vehicle comprises a plurality of waveguides 130-1, 130-2. Furthermore, the vehicle 200 comprises a radar circuit 140. The radar circuit 140 is configured to generate a common local oscillator signal and is configured to simultaneously provide respective radio frequency signals derived from the common local oscillator signal to the plurality of radar radio heads 110-1, 110-2 via the plurality of waveguides 130-1, 130-2.

At least one waveguide may connect each radar radio head to the radar circuit 140. This way, the radar circuit 140 can provide a respective RF signal to each radar radio head via a respective waveguide.

The vehicle 200 equipped with a radar system comprising the radar circuit 140, the plurality of waveguides 130-1, 130-2, and the plurality of radar radio heads 110-1, 110-2, may employ the radar system for the detection and/or tracking of targets outside the vehicle 200. Targets outside the vehicle 200 can, for instance, be obstacles, other vehicles, pedestrians and/or animals. The detection of targets can provide a higher driving safety as well as a higher comfort for a driver and/or passengers of the vehicle. For example, the radar system may also be employed for a parking assist system and/or for autonomous driving functions. The plurality of radar radio heads 110-1, 110-2 connected to the radar circuit 140 via the plurality of waveguides 130-1, 130-2 can make the detection and/or tracking of targets more accurate and/or more reliable and hence increase driving safety and/or the accuracy of parking assist systems and/or autonomous driving functions. Moreover, the radar circuit 140 being connected with each of the radar radio heads at the outer shell 201 of the vehicle 200 can avoid providing a dedicated, independent radar transceiver at the locations of each radar radio head. This can reduce costs of the radar system and thus of the vehicle 200.

Each of the plurality of radar radio heads 110-1, 110-2 can comprise an antenna. A maximum angle between two antenna main lobes of any of the antennas of the radar radio heads can be less than 20 degree (or less than 10 degree, or less than five degree). In other words, the antennas of the radar radio heads may substantially point into the same direction away from the vehicle. For example, the radar radio heads may be located at the front, the rear, the left side, or the right side of the vehicle 200. A respective antenna of a respective radar radio head can, for instance, be a horn antenna coupled to the waveguide connected to the radar radio head or can be a microstrip antenna located on a circuit board or an integrated circuit of the radar radio head. The antenna of the radar radio head can also be a rod antenna such as a dipole or monopole antenna, or a frame antenna, loop antenna or any other kind of electrically conductive structure configured for emission and/or reception of electromagnetic waves. For example, the antenna of a radar radio head can also be an antenna array. The direction of the main lobe of an antenna array can be defined as perpendicular to the antenna array for a broadside array or as in parallel (or in direction) of the antenna array for an end fire array. By orienting the main lobes of the antennas of the radar radio heads into substantially the same direction (e.g., within a cone of 20 degree) the plurality of radar radio heads 110-1, 110-2 can be employed for determining a direction towards a target outside the vehicle. For example, the plurality of radar radio heads may be used for triangulation and/or other direction of arrival estimation based algorithms.

The plurality of radar radio heads 110-1, 110-2 can be installed at a bumper (e.g., a front bumper or a rear bumper) of the vehicle, for example. For example, the plurality of radar radio heads 110-1, 110-2 may be located inside a bumper and be configured to emit radar signals and/or receive reflection of radar signals through the bumper. For example, the bumper may comprise dielectric material permeable for radar signals in the frequency range of the radar system. To this end, a thickness of the bumper may be half a wavelength or a multiple of half a wavelength of the radar signals. Alternatively, the bumper may comprise openings covered by radar lenses. Antennas of the radar radio heads can then be arranged inside the bumper and behind the radar lenses. Alternatively, patch antennas, horn antennas and/or antennas implemented as open ends of dielectric waveguides of the radar radio heads can be arranged inside openings of the bumper. Yet another alternative is to realized the antennas of the remote radio heads as microstrip antennas and to integrate them into polymeric material of the bumper and/or onto a polymeric surface of the bumper (e.g., onto the inside or outside surface of the bumper). By installing the plurality of radar radio heads 110-1, 110-2 at a bumper of the vehicle, it can be avoided that other parts of the vehicle may pose an obstacle for the emission of radar signal and/or the reception of reflected radar signals by the plurality of radar radio heads 110-1, 110-2.

According to some examples, a minimum distance between any of the radar radio heads can be larger than 5 cm (or larger than 10 cm, or larger than 25 cm, or larger than 50 cm, or larger than 1 m). Spacing the radar radio heads further apart from each other can facilitate employing the radar radio heads for triangulation in order to determine a direction from the vehicle 200 towards a target outside the vehicle 200. A maximum distance between any of the radar radio heads can be smaller than 3 m (or smaller than 2.55 m, or smaller than 1 m).

For example, at least one of the plurality of radar radio heads 110-1, 110-2 can be configured to transmit a radar signal towards a target outside the vehicle. Additionally, each of the radar radio heads 110-1, 110-2 can be configured to simultaneously receive a respective portion of a reflection of the radar signal from the target. In other words, firstly at least one of the plurality of radar radio heads 110-1, 110-2 may transmit a radar signal towards a suspected target. If the target is present, the radar signal may be reflected at the target and scattered into different direction, amongst others, also in the direction of the plurality of radar radio heads 110-1, 110-2. The radar radio heads may then substantially simultaneously receive portions of the reflected radar signal.

The transmitted radar signal can correspond to an RF signal derived from the common local oscillator and provided to the transmitting radar radio head by the radar circuit 140. For example, the transmitting radar radio head may modulate the RF signal to generate the transmitted radar signal. For instance, the transmitting radar radio head may modulate the amplitude of the RF signal to operate according to the principles of a pulse radar. Additionally or alternatively, the transmitting radar radio head may modulate the frequency of the RF signal to operate according to the principles of an FMCW radar. In yet another alternative, the radar circuit 140 may provide a frequency modulated (e.g., a linearly chirped) local oscillator signal (or a harmonic thereof) to the transmitting radar radio head. This frequency modulated local oscillator signal (or the harmonic thereof) can then correspond to (e.g., be) the RF signal provided to the transmitting radar radio head. The transmitting radar radio head may emit the RF signal via an antenna (or an antenna array) towards the target. Before emission, the radar radio head may be configured to amplify and/or to filter the RF signal. Of course, also several or all of the radar radio heads may simultaneously transmit radar signals corresponding to respective RF signals provided to the transmitting radar radio heads by the radar circuit 140. In this way, the transmitting radar radio heads may commonly synthesize a radar signal. By adjusting the phase of the individual radar signals (or RF signals) at the respective transmitting radar radio heads or at the radar circuit 140, a direction of emission of the synthesized radar signal can be controlled.

Each of the radar radio heads can be configured to mix the respective received portion of the reflection (of the transmitted radar signal) with a respective RF signal derived from the common local oscillator signal. For example, the transmitted radar signal may correspond to a frequency modulated local oscillator signal (or a harmonic thereof) of the radar circuit 140. The respective RF signals used for mixing upon reception can also correspond to the frequency modulated local oscillator signal (or the harmonic thereof). Due to the propagation time of the transmitted radar signal to the target and the propagation times of the reflected portions of the radar signal back to the radar radio heads, there can be a frequency difference between the respective RF signals used for mixing and the received reflected portions. Mixing the reflected portions of the radar signal with the RF signals can then yield respective receive signals having a frequency corresponding (e.g., being equal) to the frequency differences between the reflected portions of the radar signal and the RF signals. At each radar radio head a respective receive signal may be provided by the described mixing process. The frequency of a respective receive signal can be indicative for the distance from the respective radar radio head to the target and/or for a radial speed component of the target towards (or away from) the respective radar radio head. Because the respective RF signals are derived from the common local oscillator signal, the phase noise (and/or amplitude noise) added to the receive signals when mixing the respective reflected portions of the radar signal with the respective RF signals may be correlated in the receive signals provided by the radar radio heads. The radar circuit 140 may thus be configured to remove this correlate noise in the receive signals by applying noise cancellation algorithms. This can improve the noise figure of the radar system of the vehicle 200 and hence improve the sensitivity, accuracy and/or reliability of the radar system. Alternatively, this can enable using more value priced electronic components for the radar system.

The principles explained above in the context of an FMCW radar system can be transferred to a pulse radar system without leaving the scope of the present disclosure.

In general, each of the radar radio heads 110-1, 110-2 can be configured to provide a respective receive signal to the radar circuit 140 via a respective waveguide 130-1, 130-2. The respective receive signal can correspond to a respective received portion of the reflected radar signal. The radar circuit 140 can be configured to derive at least one of a position and speed of the target based on at least the receive signals.

For example, each radar radio head may (just) forward its received respective portion of the reflected radar signal without mixing and provide it as a respective receive signal to the radar circuit 140. For example, the receive signals may be provided to the radar circuit 140 at microwave and/or millimeter wave frequencies that can be above the cutoff frequency of the plurality of waveguides. Additionally, a respective radar radio head can be configured to amplify (e.g., by a respective low noise amplifier) and/or to filter the received respective portion of the reflected radar signal. In other words, a respective receive signal can be an amplified and/or filtered and/or frequency converted version of a corresponding received reflected portion of the radar signal.

As described for the antenna elements of the radar system 100 of FIG. 1, a respective radar radio head can be configured to derive digital data from its respective received portion of the reflected radar signal. The digital data can contain target related information (e.g., a distance to or a radial speed of the target or information from which the distance and/or the speed are derivable). The respective radar radio head can be configured to up-convert this digital data to a carrier frequency propagable across the respective waveguide connecting the radar radio head to the radar circuit 140 and thus provide the digital data via the waveguide to the radar circuit 140.

Moreover, a radar radio head can be configured to up-convert its respective received portion of the reflected radar signal without deriving digital data from it. For example, the radar radio head can be configured to up-convert to a frequency about twice (or any integer multiple) of the frequency of the transmitted radar signal or of the common local oscillator signal. The respective receive signal can then correspond to (e.g., be) the up-converted respective received portion of the reflected radar signal. The respective receive signal may then be subjected to lower bending losses of the waveguide due to its increased frequency.

The radar circuit 140 may be configured to combine the receive signals provided by the plurality of radar radio heads 110-1, 110-2, and to derive a position, a speed, a size, a geometrical structure, a category of the target from (at least) the receive signals. For example, the radar circuit 140 may be configured to recognize the target as another vehicle, as a fixed, stationary obstacle, as a pedestrian, a cyclist, or an animal. While combining the receive signals provided by the plurality of radar radio heads 110-1, 110-2, the radar circuit 140 may be configured to cancel correlated noise in the receive signals.

Furthermore, the radar circuit 140 can comprise an antenna and can be configured for transmitting a radar signal towards a target outside the vehicle and/or receiving a portion of a reflection of a radar signal from a target outside the vehicle via the antenna. In other words, the radar circuit 140 can comprise the functionality (or parts thereof) of a radar radio head. This can reduce the number of radar radio heads of the radar system and/or can increase the angular (or range) resolution of the radar system of the vehicle 200. The antenna of the radar circuit 140 can also be an antenna array. To this end, the radar circuit 140 may be installed at the outer shell 201 of the vehicle 200.

The plurality of waveguides 130-1, 130-2 can comprise metallic and or dielectric waveguides, such as metallic hollow waveguides or metallic waveguides filled (or partially filled) with a dielectric. Metallic waveguides may, for example, comprise copper, aluminum, iron, silver, gold, and/or alloys thereof. In an example, each of the plurality of waveguides 130-1, 130-2 is a dielectric waveguide, which can be less expensive than metallic waveguides. The waveguides can be connected to the radar circuit 10 and to the radar radio heads by the means described in context of the radar system 100 of FIG. 1. For example, the radar circuit 140 and/or the radar radio heads may comprise respective coupling antennas to couple RF signals into and/or out of the waveguides.

According to some examples, at least one of the plurality of waveguides 130-1, 130-2 comprises a first and second dielectric waveguide section. The first dielectric waveguide section is connected to the second dielectric waveguide section by a conductive sleeve. The conductive sleeve can, for example, be wrapped around a joint of the first and the second dielectric waveguide and can comprise conductive metals such as copper and/or aluminum. The conductive sleeve may also be constituted by a feed through a shielded housing of the radar circuit 140. For example, the first dielectric waveguide section may extend inside the shielded housing from the radar circuit 140 to the feed in a compartment wall of the shielded housing and the second dielectric waveguide section may extend from the feed to a radar radio head. Also, more than one radar radio head may be connected to the radar circuit 140 in the described way. Constructing a waveguide (or waveguides) from two or more connectable and disconnectable dielectric waveguide sections can facilitate installing the radar system inside the vehicle 200 and can facilitate maintenance and/or repairs of the radar system.

In some embodiments, at least one of the plurality of waveguides 110-1, 110-2 can be foam-padded (or at least partially foam-padded). Foam-padding of a waveguide can prevent the waveguide from touching other (metallic) parts of the vehicle which could increase the insertion loss of the waveguide or degrade the matching of the waveguide to the radar circuit 140 or the respective radar radio head. The foam-padding can comprise solid polymeric material such as polystyrene, polyurethane, and/or polyethylene terephthalate, for example.

More details and aspects are mentioned in connection with the embodiments described above or below. The embodiment of the vehicle 200 shown in FIG. 2 may comprise one or more optional additional features corresponding to one or more aspects mentioned in connection with the proposed concept or one or more embodiments described in the context of the radar system 100 of FIG. 1. For example, the radar circuit 140 of the vehicle 200 may correspond to the radar unit 140 of the radar system 100 of FIG. 1. Radar radio heads of the vehicle 200 may comprise features and/or perform functions of the antenna elements 110-1, 110-2 of the radar system 100 of FIG. 1 (or vice versa).

For example, the vehicle 200 can be a car, a truck, a motorbike, a train, an airplane, a boat, a ship, and/or a remote controlled vehicle such as a robot, a drone, and/or a toy.

Figure 3:
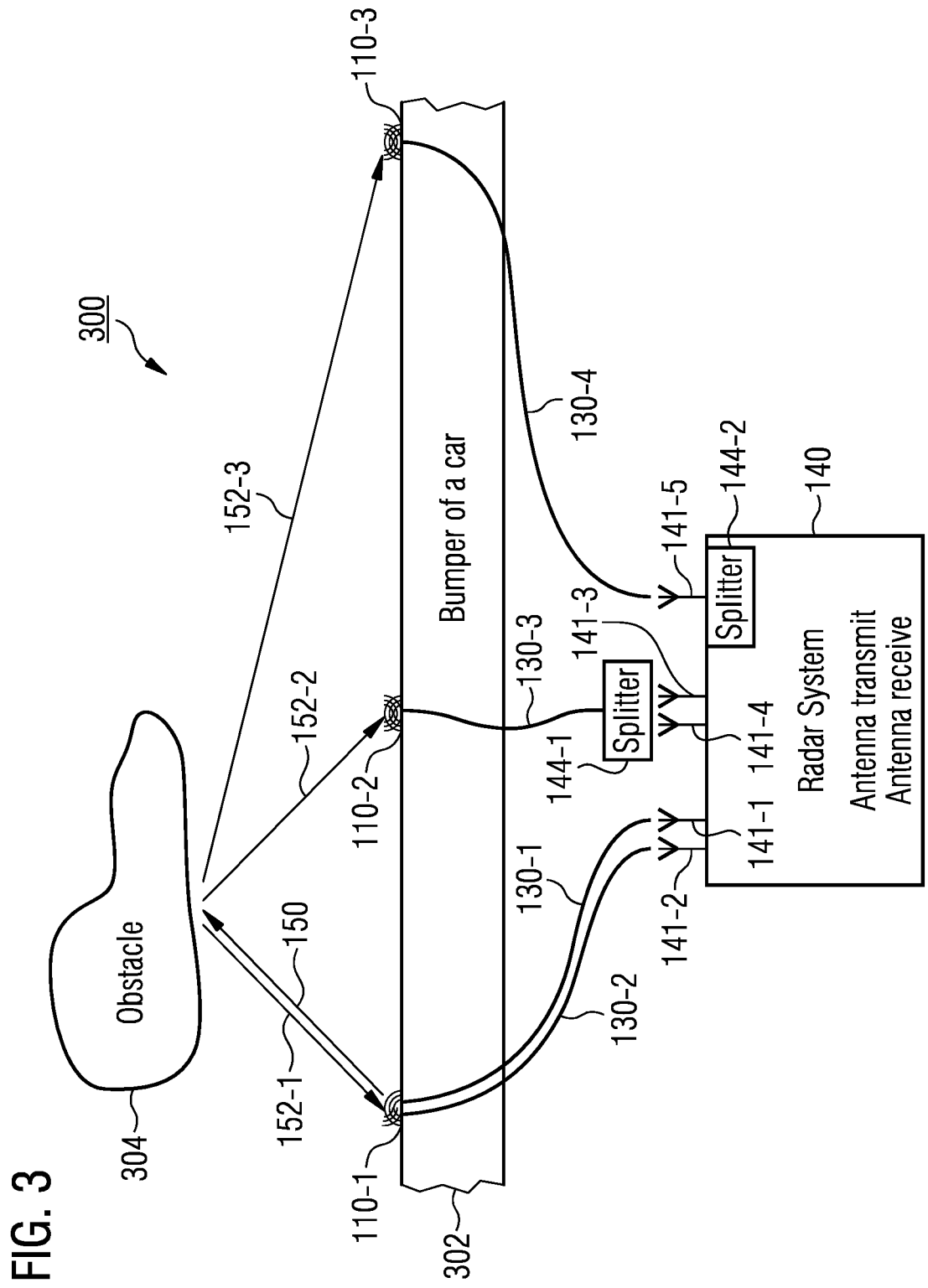
FIG. 3 shows block diagram of a radar system installed at a bumper of a vehicle.

FIG. 3 shows block diagram of a radar system 300 for a vehicle according to an embodiment. The radar system 300 comprises a radar unit 140. The radar unit 140 is coupled to a first, second, and third antenna element 110-1, 110-2, 110-3 via respective waveguides. The first, second, and third antenna element 110-1, 110-2, 110-3 are installed at the outside surface of a bumper of the vehicle. The first, second, and third antenna element 110-1, 110-2, 110-3 are installed next to each other and separated by some distance (e.g., a distance larger than 5 cm).

At one end, a first waveguide 130-1 is connected to the first antenna element 110-1 (e.g., to a transmit antenna of the first antenna element 110-1). At the other end, the first waveguide 130-1 is coupled to a first coupling antenna 141-1 of the radar unit 140. The first coupling antenna 141-1 is connected to a first transmitter and/or local oscillator output port of the radar unit 140. The radar unit 140 can couple a first RF signal via the first coupling antenna 141-1 to the first waveguide 130-1 and provide it via the first waveguide 130-1 to the first antenna element 110-1. A first receive signal of the first antenna element 110-1 can be provided to the radar unit 140 via a second waveguide 130-2. At one end, the second waveguide 130-2 is connected to the first antenna element 110-1 (e.g., to a receive antenna of the first antenna element 110-1). At the other end, the second waveguide 130-2 is coupled to a second coupling antenna 141-2 of the radar unit 140. The second coupling antenna 141-2 is connected to a first receiver input port of the radar unit 140.

In contrast to the first antenna element 110-1, the second antenna element 110-2 is connected by only one waveguide, the third waveguide 130-3, to the radar unit 140. At one end, the third waveguide 130-3 is connected to the second antenna element 110-2 (e.g., to a transceive antenna of the second antenna element 110-2). At the other end, the third waveguide 130-3 is connected to a (first) signal splitter 144-1. The radar unit 140 can provide a second RF signal via a third coupling antenna (that is connected to a second transmitter and/or local oscillator output port of the radar unit 140) and via the signal splitter 144-1 to the third waveguide 130-3 and via the third waveguide 130-3 to the second antenna element 110-2. The second antenna element 110-2 can provide a second receive signal via the third waveguide 130-3, the signal splitter 144-1 and a fourth coupling antenna 141-4 (that is connected to a second receiver input port of the radar unit 140) to the radar unit 140.

The third antenna element 110-3 (e.g., a transceive antenna of the third antenna element 110-3) is also connected by just one waveguide, the fourth waveguide 130-4, to a fifth coupling antenna 141-5 of the radar unit 140. The fifth coupling antenna 141-5 is connected to a common port of another (second) signal splitter 144-2. This signal splitter 144-2 is integrated into the radar unit 140. A first thru-port of the signal splitter 144-2 can be connected to a transmit or local oscillator path of the radar unit 140 for providing a third RF signal from the radar unit 140 to the third antenna element 110-3. A second thru-port of the signal splitter 144-2 can be connected to a receiver signal path of the radar unit 140. In this way, a third receive signal can be provided via the fourth waveguide 130-4 by the third antenna element 110-3 to the radar unit 140.

As shown in FIG. 3, the first antenna element 110-1 is transmitting a (first) radar signal 150 towards a target 304 (e.g., an obstacle). The radar signal 150 is scattered at the target 304, so that a first portion 152-1 of the radar signal 150 is reflected back to the first antenna element 110-1. Furthermore, a second portion 152-2 of the radar signal 150 is reflected back to the second antenna element 110-2, and a third portion 152-3 of the radar signal 150 is reflected back to the third antenna element 110-3. The first, second, and third antenna element 110-1, 110-2, 110-3 can then simultaneously receive the respective portions 152-1, 152-2, 152-3 of the reflected radar signal 150. Corresponding to the respective portions of the reflected radar signal 150, the first antenna element 110-1 can provide the first receive signal via the second waveguide 130-2 to the radar unit 140, the second antenna element 110-2 can provide the second receive signal via the third waveguide 130-3 to the radar unit 140, and the third antenna element 110-3 can provide the third receive signal via the fourth waveguide 130-4 to the radar unit 140. Based on at least the first, second, and third receive signal (and e.g. optionally on the common local oscillator signal) the radar unit 140 can determine a position (e.g., by triangulation) and/or a speed of the target 304.

Afterwards, the second antenna element 110-2 may transmit a second radar signal (and/or the third antenna element 110-3 may transmit a third radar signal, respectively). The first, second, and third antenna element 110-1, 110-2, 110-3 may then simultaneously receive respective portions of the reflected second radar signal (and/or of the reflected third radar signal, respectively).

For example, FIG. 3 shows distributing radar signals over waveguides (e.g. plastic fibers or hollow metal waveguides) to different positions in the bumper 302. The radar signal can be emitted at the end (e.g., at the antenna elements) of the fiber and reflected radar signals from the target 304 can be received with the same waveguide and/or with a different one. The received signal(s) can be lead through the waveguide (or waveguides) back to the radar transceiver (e.g. the radar unit 140).

Examples with one or two fibers (e.g., dielectric waveguides) are shown in FIG. 3. Different locations of the splitters (e.g., signal splitters 144-1, 114-2) for the separation of transmitted and received signals are shown as well, e.g. between the (coupling) antennas and the fiber or being part of the electronic subsequent to a single transmit/receive antenna (e.g., the fifth coupling antenna 141-5).

Furthermore, radar lenses may be used to increase the amount of received energy of the reflected wave and focus it towards the waveguide (e.g., the waveguides 130-1, 130-2, 130-3).

The same concept may be used for different applications of radar environments object detection in a limited range (e.g., a range smaller than 5 m) as well. An example for industrial or consumer use could be collision avoidance for any kind of robots and/or drones.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g. FIGS. 1-2) or below (e.g. FIGS. 4-5).

Figure 4:
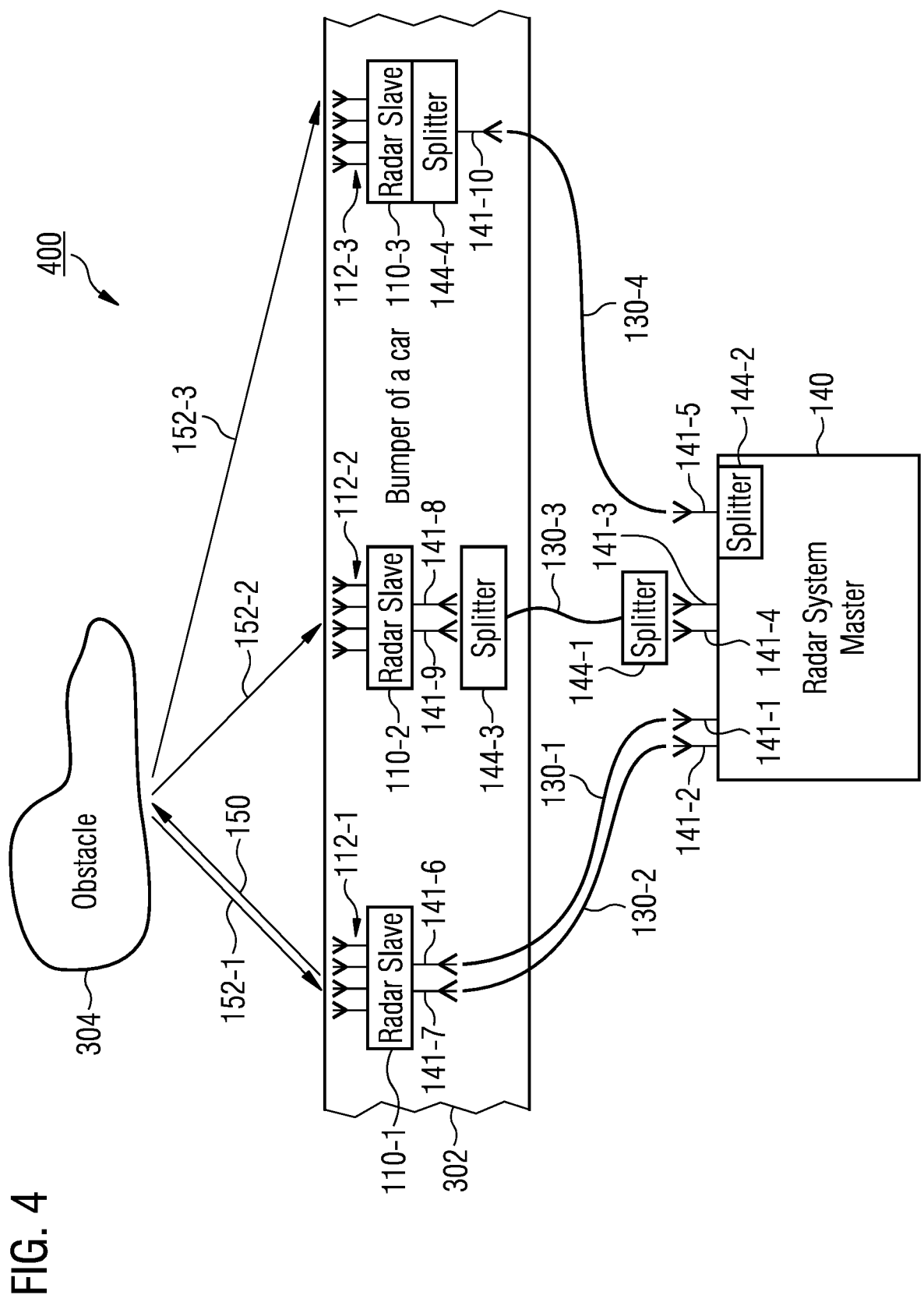
FIG. 4 shows block diagram of another radar system installed at a bumper of a vehicle.

FIG. 4 shows block diagram of a radar system 400 for a vehicle according to another embodiment. The radar system 400 may be similar to the radar system 300 of FIG. 3.

The radar system 300 comprises a radar circuit 140 as well as a first, second, and third radar radio head 110-1, 110-2, 110-3 installed in a bumper of the vehicle. The first, second, and third radar radio head 110-1, 110-2, 110-3 are connected via respective waveguides to the radar circuit 140. The first, second, and third radar radio head 110-1, 110-2, 110-3 can comprise additional signal processing circuitry, for example, respective mixers driven by respective RF signals derived from a common local oscillator signal generated by the radar circuit 140 and provided via the respective waveguides to the radar radio heads 110-1, 110-2, 110-3.

For example, a first RF signal derived from the common local oscillator signal can be provided via a first waveguide 130-1 from the radar circuit 140 to the first radar radio head 110-1. The first RF signal may be coupled to the first radar radio head 110-1 via a sixth coupling antenna 141-6 of the first radar radio head 110-1. Furthermore, the first radar radio head 110-1 can comprise a seventh coupling antenna 141-7 to couple a (first) receive signal into a second waveguide 130-2 and provide the receive signal via the second waveguide 130-2 to the radar circuit 140. Moreover, the first radar radio head 110-1 comprises a first antenna array 112-1 to emit a (first) radar signal and/or to receive a reflection of a radar signal emitted from the radar system 400.

A second RF signal also derived from the common local oscillator signal can be provided via a third waveguide 130-3 from the radar circuit 140 to the second radar radio head 110-2. The second radar radio head 110-2 can provided a (second) receive signal via the same third waveguide 130-3 to the radar circuit 140. To this end, another (third) signal splitter can be attached to the end of the third waveguide at the second radar radio head 110-2. This signal splitter 144-3 can provide the second RF signal from the third waveguide 130-3 to an eighth coupling antenna 141-8 of the second radar radio head 110-2. The second radar radio head 110-2 may provide the second receive signal via a ninth coupling antenna and the signal splitter 144-3 to the third waveguide 130-3. Moreover, the second radar radio head 110-2 comprises a second antenna array 112-2 to emit a (second) radar signal and/or to receive a reflection of a radar signal emitted from the radar system 400.

A third RF signal also derived from the common local oscillator signal can be provided via a fourth waveguide 130-4 from the radar circuit 140 to the third radar radio head 110-3. The third radar radio head 110-3 can provide a (third) receive signal via the same fourth waveguide 130-4 to the radar circuit 140. To this end, the fourth waveguide 130-4 can be coupled to a tenth coupling antenna 141-10 of the third radar radio head 110-3. The third radar radio head 110-3 may comprise a (fourth) signal splitter 144-4. Via this signal splitter 144-4, the third RF signal can be provided to the third radar radio head 110-3 and the third receive signal can be provided to the fourth waveguide 130-4 and eventually to the radar circuit 140. Moreover, the third radar radio head 110-3 comprises a third antenna array 112-3 to emit a (third) radar signal and/or to receive a reflection of a radar signal emitted from the radar system 400.

The connections of the first, second, third, and fourth waveguide 130-1, 130-2, 130-3, 130-4 to the radar circuit 140 can be made as explained in the context of FIG. 3, for example.

According to FIG. 4, the (common) local oscillator signal of a single master (e.g., the radar circuit 140) can be distributed to multiple slaves (e.g., the first, second, and third radar radio head 110-1, 110-2, 110-3) at different locations. In order to avoid extreme pulse dispersion effects on a transmission line that uses a conductor, the signal (e.g., the common local oscillator signal) is distributed directly as a radar signal in the intended frequency range (e.g., between 76 GHz and 81 GHz) or even on a higher harmonic frequency (e.g., between 152 GHz and 162 GHz) to reduce the dimensions of the fiber (e.g., of the first, second, third, and fourth waveguide 130-1, 130-2, 130-3, 130-4) and decrease its bending losses.

The fibers (e.g., the second, third, and fourth waveguide 130-2, 130-3, 130-4) can also be used as communication channels to deliver preprocessed data (e.g., digital data) of each local radar slave (e.g., each radar radio head) back to the system master (e.g., the radar circuit 140). The duplex operation can be implemented using different fibers for either direction or using a single fiber in combination with splitters that separate the signals for the different directions, for example.

Obtaining the local oscillator signal from one single source (e.g., from the radar circuit 140) can make the transmitters and receivers (e.g., the radar radio heads) operate in a coherent way. This way, the same phase noise representation can be used on all channels. The resulting suppression of phase noise in the down-converted received signal due to LO signal correlation can improve overall radar system performance.

Embodiments with 1 or 2 fibers (e.g., waveguides) are shown in FIG. 4. Different locations of the splitters (e.g., the signal splitters 144-1, 144-2, 144-3, 144-4) for the separation of transmitted and received signals are shown as well, e.g. between the (coupling) antennas and the fiber (e.g., a waveguide) or being part of the electronic subsequent to a single transmit/receive antenna (e.g., the fifth and tenth coupling antenna 141-5, 141-10). Furthermore, the master transceiver (e.g., the radar circuit 140) might be combined with one of the slaves (e.g., a radar radio head) and may operate as radar transceiver itself.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g. FIGS. 1-3) or below (e.g. FIG. 5).

Figure 5:
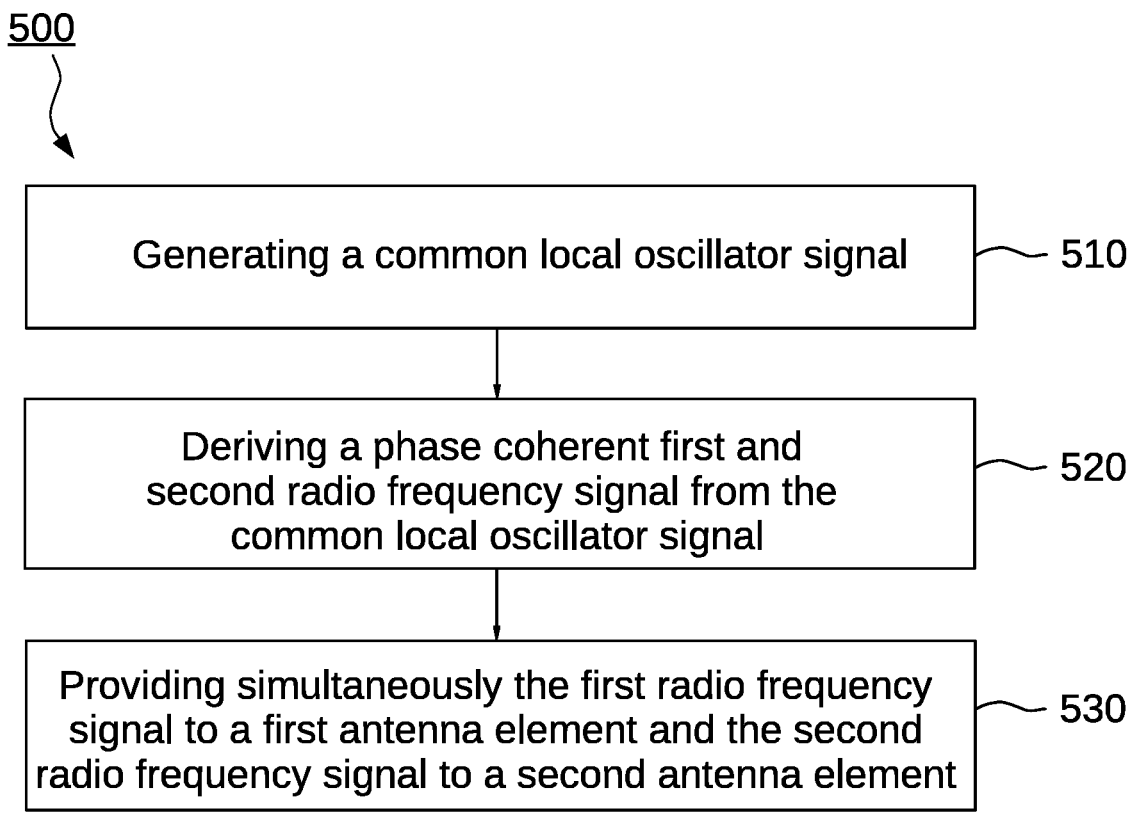
FIG. 5 shows a flow chart of a method for operating a radar system of a vehicle.

FIG. 5 shows a flow chart of a method 500 for operating a radar system of a vehicle. The method 500 comprises generating 510 a common local oscillator signal with a radar unit of the vehicle. Furthermore, the method 500 comprises deriving 520 a phase coherent first and second radio frequency signal from the common local oscillator signal. Furthermore, the method 500 comprises providing 530 simultaneously the first radio frequency signal to a first antenna element of the vehicle via a first dielectric waveguide and the second radio frequency signal to a second antenna element of the vehicle via a second dielectric waveguide.

Providing 530 simultaneously the phase coherent first and second RF signal to the first and second antenna element, respectively, can reduce the hardware complexity and hence the manufacturing costs of the radar system. Furthermore, due to the phase coherence of first and second RF signal the noise figure of the radar system can be reduced, which can in turn lead to a higher sensitivity, accuracy, and/or reliability of the radar system.

Additionally, the method 500 can comprise transmitting a radar signal based on the first and the second radio frequency signal simultaneously from the first and the second antenna element towards a target outside the vehicle.

According to the method 500, the radar system may be operated in a frequency range above 20 GHz (or above 50 GHz, or above 75 GHz, or above 90 GHz, or above 120 GHz, or above 1000 GHz). A higher frequency (e.g., a higher frequency of the emitted radar signals) can provide a higher range and/or angular resolution of the radar system.

Additionally, the method 500 can comprise receiving a first portion of a reflection of a radar signal from a target outside the vehicle at the first antenna element and a second portion of the reflection at the second antenna element. Furthermore, the method 500 can comprise mixing the first portion of the reflection with the first radio frequency signal at the first antenna element and mixing the second portion of the reflection with the second radio frequency signal at the second antenna element. Because both the first and the second RF signal are derived from the common local oscillator signal, noise (e.g., phase noise and/or amplitude noise) added to the received first and second portion of the reflected radar signal in the course of mixing can be correlated. The mixed first and the second portion of the reflected radar signal can be provided as a first and second receive signal, respectively, to the radar unit. Due to the correlation of the noise in the first and second receive signal, the radar unit may recognize the noise in the first and second receive signal and may at least partially cancel the noise by applying noise cancellation algorithms.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g. FIGS. 1-4) or below.

Some embodiments relate to radar synchronization and communication over plastic (e.g., dielectric) waveguides. For example, radar transmitters (e.g., the radar radio heads) can be used and distributed over the bumper of a car for discrimination of the direction towards a reflecting obstacle (e.g., a target). For this purpose, the radar transmitters and receivers can be synchronized to the same reference frequency (e.g., a common local oscillator signal). Radar signals (e.g., RF signals derived from a common local oscillator signal) distributed over waveguides to different transmit receive positions (e.g., to the radar radio heads) can allow triangulation with improved accuracy.

According to another aspect of the present disclosure, it is provided a radar parking aid using transmit and receive waveguides (e.g., dielectric waveguides) as well as means for short range radar monitoring. For example, radar signals (e.g., RF signals derived from a common local oscillator signal) can be distributed over waveguides to different transmit and receive positions (e.g., different antenna elements) in order to allow spatial resolution enhancement. Such radar systems can, for example, replace ultrasonic parking assists.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A radar system for a vehicle, comprising:
   a first antenna element and a second antenna element installable at an outer shell of the vehicle;
   a first dielectric waveguide and a second dielectric wave guide; and
   a radar circuit configured to simultaneously communicate with the first antenna element via the first dielectric waveguide and with the second antenna element via the second dielectric waveguide, and to generate phase coherently for a first and a second radio frequency signal, to provide the first radio frequency signal to the first antenna element via the first dielectric waveguide, and to provide the second radio frequency signal to the second antenna element via the second dielectric waveguide,
   wherein the first antenna element is configured to adjust a phase of the first radio frequency signal, and the second antenna element is configured to adjust a phase of the second radio frequency signal.

2. The radar system of claim 1, wherein the radar circuit and the first antenna element are configured for at least one of commonly emitting a synthesized radar signal towards a target and simultaneously receiving respective portions of a reflection of a radar signal from the target.

3. The radar system of claim 1, wherein the first antenna element is implemented as an open end of the dielectric waveguide.

4. The radar system of claim 1, wherein the radar circuit is configured to modulate the first and the second radio frequency signals.

5. The radar system of claim 1, wherein the radar circuit is configured to generate a common local oscillator signal and to derive the first and the second radio frequency signals from the common local oscillator signal.

6. The radar system of claim 1, wherein the first antenna element is configured to emit a radar signal corresponding to the first radio frequency signal.

7. The radar system of claim 1, wherein the first antenna element is configured to provide a first receive signal corresponding to a first portion of a radar signal reflected from a target and incident at the first antenna element to the radar circuit, and the second antenna element is configured to simultaneously provide a second receive signal corresponding to a second portion of the reflected radar signal incident at the second antenna element to the radar circuit.

8. The radar system of claim 7, further comprising a radar lens configured to focus the first portion of the reflected radar signal towards the first antenna element and to focus the second portion of the reflected radar signal towards the second antenna element.

9. The radar system of claim 7, further comprising a third dielectric waveguide, wherein the first antenna element is configured to provide the first receive signal to the radar circuit via the third dielectric waveguide.

10. The radar system of claim 7, wherein the radar circuit is configured to mix the first portion of the reflected radar signal with the first radio frequency signal for providing the first receive signal, and the radar circuit is configured mix the second portion of the reflected radar signal with the second radio frequency signal for providing the second receive signal.

11. The radar system of claim 7, wherein the radar circuit is configured to demodulate the first portion of the reflected radar signal for providing the first receive signal, and the radar circuit is configured to demodulate the second portion of the reflected radar signal for providing the second receive signal.

12. The radar system of claim 11, wherein the radar circuit is configured to derive first digital data from the demodulated first portion of the reflected radar signal and to modulate the first receive signal according to the first digital data, and the radar circuit is configured to derive second digital data from the demodulated second portion of the reflected radar signal and to modulate the second receive signal according to the second digital data.

13. The radar system of claim 1, wherein the first and the second antenna elements constitute at least a part of an antenna array.

14. The radar system of claim 13, wherein the radar circuit comprises at least one antenna being an element of the antenna array.

15. The radar system of claim 4, wherein the radar circuit comprises a first coupling antenna coupled to the first dielectric waveguide, and a second coupling antenna coupled to the second dielectric waveguide.

16. A vehicle, comprising:
   a plurality of radar radio heads arranged at an outer shell of the vehicle;
   a plurality of waveguides; and
   a radar circuit configured to generate a common local oscillator signal and simultaneously provide respective radio frequency signals derived from the common local oscillator signal to the plurality of radar radio heads via the plurality of waveguides, and to generate phase coherently for the radio frequency signals, wherein the radar radio heads are configured to adjust phases of the radio frequency signals.

17. The vehicle of claim 16, wherein each of the plurality of radar radio heads comprises an antenna, and a maximum angle between two antenna main lobes of any of the antennas of the radar radio heads is less than 20 degree.

18. The vehicle of claim 16, wherein the plurality of radar radio heads is installed at a bumper of the vehicle.

19. The vehicle of claim 16, wherein a minimum distance between any of the radar radio heads is larger than 5 cm.

20. The vehicle of claim 16, wherein at least one of the plurality of radar radio heads is configured to transmit a radar signal towards a target outside the vehicle, and each of the radar radio heads is configured to simultaneously receive a respective portion of a reflection of the radar signal from the target.

21. The vehicle of claim 20, wherein each of the radar radio heads is configured to mix the respective received portion of the reflection with a respective radio frequency signal derived from the common local oscillator signal.

22. The vehicle of claim 16, wherein the radar circuit comprises an antenna and is configured for at least one of transmitting a radar signal towards a target outside the vehicle and receiving a portion of a reflection of a radar signal from a target outside the vehicle via the antenna.

* * * * *